No. 613,995. Patented Nov. 8, 1898.
J. M. HOMESLEY.
PLANTER ATTACHMENT FOR WHEEL CULTIVATORS.
(Application filed July 13, 1898.)
(No Model.)

Witnesses.

Inventor:
James M. Homesley.
By
James L. Norris.
Atty.

UNITED STATES PATENT OFFICE.

JAMES MOSSES HOMESLEY, OF MOFFAT, TEXAS.

PLANTER ATTACHMENT FOR WHEEL-CULTIVATORS.

SPECIFICATION forming part of Letters Patent No. 613,995, dated November 8, 1898.

Application filed July 13, 1898. Serial No. 685,855. (No model.)

*To all whom it may concern:*

Be it known that I, JAMES MOSSES HOMESLEY, a citizen of the United States, residing at Moffat, in the county of Bell and State of Texas, have invented new and useful Improvements in Planter Attachments for Wheel-Cultivators, of which the following is a specification.

This invention relates to a planter attachment for wheel-cultivators, and has for its object to provide an improved planting attachment adapted to be readily applied to any cultivator of ordinary or usual construction without altering the construction or modifying the operation of the latter.

It also has for its object to provide improved means for adjustably connecting the seed-dropping mechanism to the cultivator-beams in such manner that the latter may be freely swung from one side or the other of the line of draft and the dropping mechanism may be adjusted relatively to the cultivator-shovels.

It has for its further object to combine with such adjustable connections means for altering the inclination of the seed-dropping foot.

It has for another object to provide novel driving mechanism for the seed stirring and feeding devices, by means of which the attachment may be adapted to cultivators having differently-gaged wheels.

It has for a still further object to provide a novel attachment for the seed-foot for permitting the latter to yield when an obstruction is encountered to prevent injury to any of the parts.

Finally, it has for its object to improve and simplify this class of attachments generally.

To these ends my invention consists in the features and in the construction, combination, and arrangement of parts hereinafter described, and particularly pointed out in the claims following the description, reference being had to the accompanying drawings, forming a part of this specification, wherein—

Figure 1:
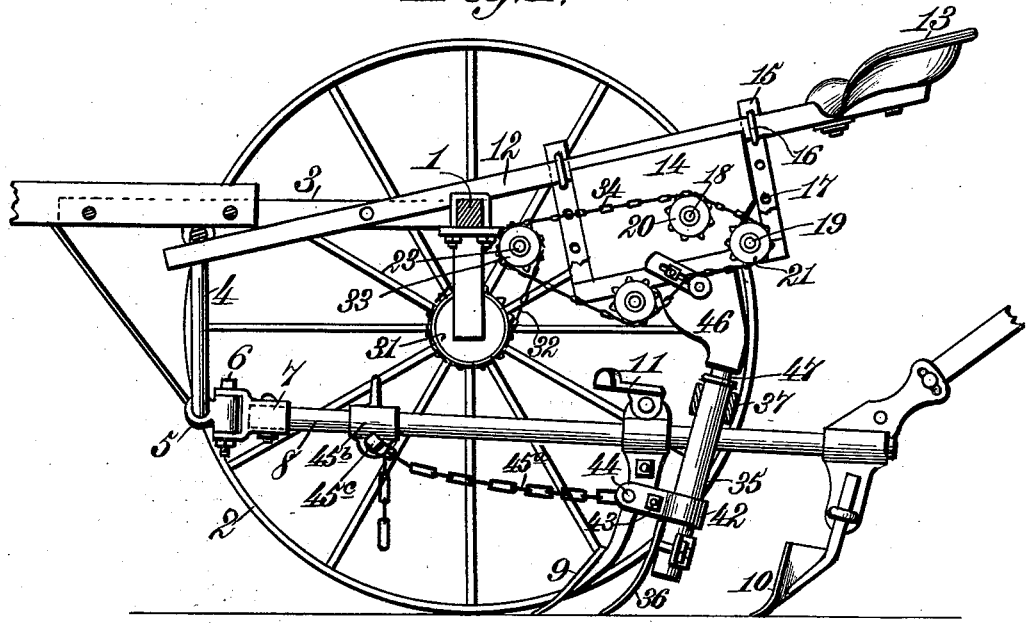
Figure 2:
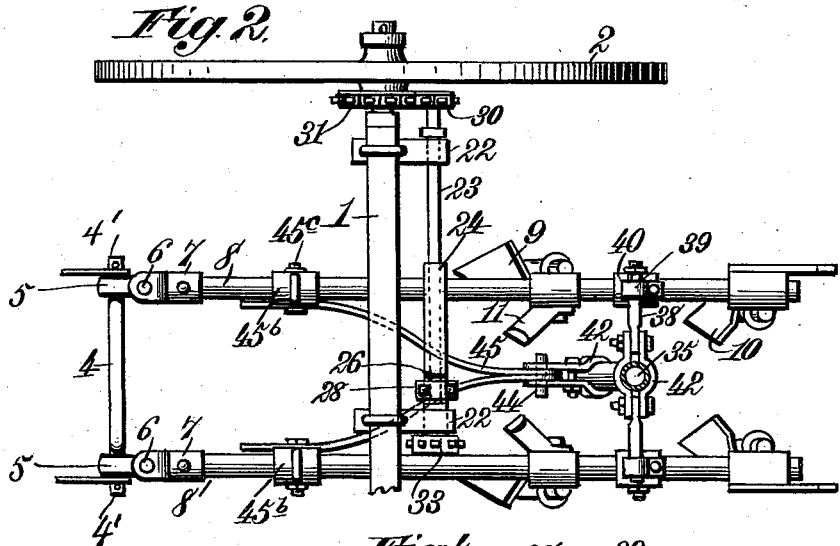
Figure 3:
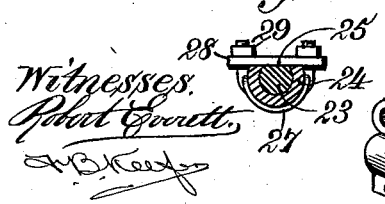
Figure 4:
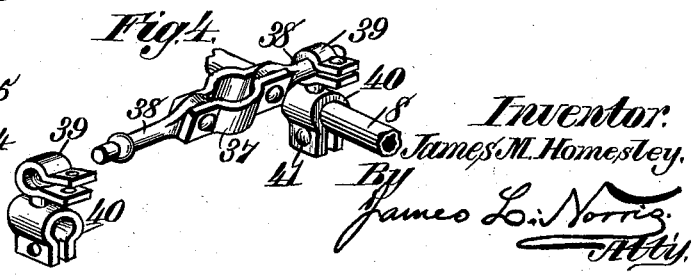

Figure 1 is a vertical sectional view of a cultivator with my improved attachment applied thereto. Fig. 2 is a top plan view thereof, a portion of the axle and one of the ground-wheels being broken away. Fig. 3 is a detail view illustrating the means for fastening together the sections of the telescoping shaft, and Fig. 4 is a detail view of the means for supporting the seed-dropping foot.

Referring to the drawings, the numeral 1 indicates the axle, and 2 the ground-wheels, of a cultivator. To the frame 3 is attached an arched support 4, on the outwardly-bent lower ends 4' of which are journaled yokes 5, that are adapted to oscillate in vertical arcs of a circle. Pivot-pins 6 pass vertically through the yokes 5 and serve to pivot thereto clips 7, which are clamped to the forward ends of the cultivator-beams 8. The cultivator-beams 8 are thus adapted to be oscillated both laterally and vertically. Clamped on the rear portions of each of the cultivator-beams 8 are two cultivator-shovels 9 and 10, one being arranged in advance of the other, as shown. Suitable hand-levers of ordinary construction (not shown) may be provided for raising and lowering the cultivator-beams, and foot-rests 11 are attached to said beams, by means of which the beams may be swung to the right or left of the line of draft by the feet of the operator, as hereinafter explained. Fixed to the axle are two rearwardly-projecting seat-supporting beams 12, carrying the operator's seat 13.

The cultivator, briefly described above, is of ordinary construction and forms no part of the present invention, it merely being shown as illustrating one form of cultivator to which my improved attachment may be applied.

The numeral 14 indicates the seed-hopper, which is supported upon the seat-beams by four metal straps 15, said straps at their lower ends being fixed to the hopper and at their upper ends adjustably attached to the beams 12 by clips 16. By loosening the clips the hopper may be adjusted toward and from the axle 1, and by providing said straps with a plurality of holes 17 for the clips to pass through the hopper may be vertically adjusted in an obvious manner. In the hopper are journaled a stirrer-shaft 18 and feed-shaft 19, carrying suitable stirring and feeding or dropping devices, (not shown,) and on the outer ends of said shafts are respectively fixed sprocket-wheels 20 and 21. Removably clipped to the axle 1 are shaft-bearings 22, in which is journaled a telescoping shaft 23 24. The said shaft consists of a solid rod 23, on one end of which is sleeved a tubular shaft 24. That portion of the shaft 23 which is embraced by the tubular shaft 24 is flattened on one side, as at 25, and a corresponding slot 26 is formed in one side of the tubular shaft 24. A U-shaped clip 27 embraces the tubular shaft, and over its threaded ends is arranged a plate 28, that fits the slotted portion of the shaft 24 and engages the flat side of the shaft 23. Said plate is held in place by nuts 29, screwed over the ends of the clip. By tightening up the nuts the plate is drawn through the slot 26 in the tubular shaft and tightly engages the flattened portion 25 of the shaft 23, thus causing the parts 23 and 24 of the shaft to rotate together. On the end of the shaft 23 is fixed a sprocket-wheel 30, which is adapted to be connected to a sprocket-wheel 31, fixed to the ground-wheel 2 in any suitable manner, by a sprocket-chain 32, and on the opposite end of the tubular shaft 24 is fixed a sprocket-wheel 33, which is connected by a sprocket-chain 34 with the sprocket-wheels 20 and 21 on the stirrer and feed shafts, whereby the latter are rotated. By means of the clip 27 the telescopic shaft 23 24 may be lengthened and shortened to adapt the driving mechanism to cultivators having varying gage of wheels.

The numeral 35 indicates the seed-dropping foot, consisting of a metallic tube having rigidly attached to its lower end a furrow-opening plow 36, which travels in advance of the foot shown. Firmly fitted around the upper end of the foot 35 is a yoke 37, between the opposite ends of which are pivoted the inner ends of two arms 38. The outer ends of the arms 38 are journaled in bearings 39, which are swiveled in split collars 40, clamped by bolts 41 about the cultivator-beams. A split collar 42 is also clamped by a bolt 43 about the lower end of the foot 35, and between the split ends thereof are fastened by a break-pin 44 the rear ends of two metallic straps 45 or chains 45$^a$, the forward ends of which are fixed to collars 45$^b$, fastened to the cultivator-beams by bolts 45$^c$.

Attached to the under side of the hopper, beneath the seed-discharge, is a boot 46, formed of leather, canvas, or similar strong and flexible material and attached at its lower end to the upper end of a discharge-tube 47. The lower end of the discharge-tube 47 is loosely disposed in the foot 35, whereby the seed discharged from the hopper passes through the boot and discharge-tube into the foot and by the latter is dropped to the ground.

The operation of my improved planter attachment is as follows: To apply the attachment to a cultivator, it is merely necessary to clip the shaft 23 24 to the axle of the cultivator, attach the hopper to the seat-supports, and connect the foot to the cultivator-beams in the manner described. Then by gearing the sprocket-wheels together by the sprocket-chains the cultivator is converted into a planter without alteration to the latter. As the machine is drawn over the field the forward shovels 9 operate to throw the earth up into a hill or ridge and the plow 36 opens the same. The seed discharged by the hopper is dropped by the foot 35 immediately behind the plow 36 into the furrow opened by the latter and is covered over by earth thrown over into the furrow by the shovels 10. The operator rests his feet in the foot-rest 11, and is thereby enabled to shift the cultivator-beams to the right or left, as occasion may require, to form a perfectly straight furrow. The cultivator-beams are held spread apart by the arms 38 and yoke 37, and by swiveling the bearings 39 of the arms in the collars 40 the cultivator-beams are permitted to be freely oscillated laterally in the manner described. The lower end of the foot 35 being held fixed by the straps 45 or chains 45$^a$, it will be manifest that by adjusting the collars 40 longitudinally on the cultivator-beams the inclination of the foot may be altered as desired, and in the same manner by adjustably connecting the straps 45 or chains 45$^a$ to the collars 45$^b$ the foot may be adjusted relatively to the cultivator-shovels without altering its inclination. By connecting the rear ends of the straps or chains to the foot by a break-pin should the opening-plow encounter an obstruction the pin will break, thus permitting the foot and its plow to swing rearwardly and free of the obstruction without damage to any of the parts. The discharge-tube 47 fitting loosely in the foot and being flexibly connected to the discharge-hopper by the boot 46 the cultivator-beams may be freely raised and lowered and oscillated from right to left and the various adjustments of the foot described are also rendered possible. To permit of a wider adjustment of the foot both horizontally and vertically, the hopper is adjustably supported on the seat-supports, as described, whereby the hopper may be raised and lowered or moved forward or rearward to permit of an extreme adjustment of the foot not ordinarily permitted by the boot. After the planting has been accomplished the attachment may be quickly removed therefrom, when the cultivator will again be in proper condition for performing its normal functions.

I have shown the hopper supported beneath the seat-beams by straps 15; but in those cultivators where the seat-beams are quite low it will be manifest that the straps may be reversed and the hopper supported above the beams. It will also be evident that various details of construction may be altered or varied without departing from the spirit of my invention, and I therefore wish it to be understood that I do not confine myself to the details shown excepting as pointed out in the claims.

Having described my invention, what I claim is—

1. The combination with a wheeled cultivator and its oscillating beams carrying shovels, of collars adjustably arranged on said beams, bearings swiveled on said collars, arms journaled in said bearings, and a seed-dropping foot carried by said arms and provided with a plow, substantially as described.

2. The combination with a wheeled cultivator and its oscillating beams carrying shovels, of collars adjustably arranged on said beams, bearings swiveled on said collars, arms journaled in said bearings, a seed-dropping tube provided at its lower end with a plow and a yoke clamped about the upper end of said foot and bolted to the inner, adjacent ends of said arms, substantially as described.

3. The combination with a wheeled cultivator and its oscillating beams carrying shovels, of swiveled bearings longitudinally adjustable on the beams, arms journaled in said bearings, a seed-dropping foot connected at its upper end with said arms and carrying a plow, and straps connected at their rear ends to the lower end of said foot and at their forward ends to fixed supports carried by the cultivator, substantially as described.

4. The combination with a wheeled cultivator and its oscillating beams carrying shovels, of swiveled bearings longitudinally adjustable on the beams, arms journaled in said bearings, a seed-dropping foot connected at its upper end with said arms and carrying a plow, and straps connected at their rear ends to the lower end of said foot and at their forward ends adjustably connected to fixed supports carried by the cultivator, substantially as described.

5. The combination with a wheeled cultivator and its oscillating beams carrying shovels, of a pendent seed-dropping foot pivotally suspended at its upper end from the cultivator-beams and provided with a plow, and straps connected at their forward ends to fixed supports carried by the cultivator and connected at their rear ends to the lower end of said foot by a break-pin, substantially as described.

6. The combination with a wheeled cultivator and its oscillating beams carrying shovels, of a pendent seed-dropping foot pivotally suspended at its upper end from the cultivator-beams and provided with a plow, means for adjustably holding the lower end of the foot fixed, a seed-hopper, a flexible boot connected to the discharge end of the hopper, and a discharge-tube connected at its upper end with the boot and loosely arranged at its lower end in the foot, substantially as described.

7. The combination with a wheeled cultivator and its oscillating beams carrying shovels, of a pendent seed-dropping foot pivotally suspended at its upper end from the cultivator-beams and provided with a plow, means for adjustably holding the lower end of the foot fixed, a seed-hopper, adjustable both vertically and longitudinally on a fixed part of the cultivator-frame, a flexible boot connected to the discharge end of the hopper, and a discharge-tube connected at its upper end with the boot and loosely arranged at its lower end in the foot, substantially as described.

8. The combination with a wheeled cultivator provided with a sprocket-wheel on one of its ground-wheels, of a seed-hopper provided with suitable stirring and feeding devices, a telescoping shaft journaled in bearings removably attached to the axle, sprocket-wheels fixed to the opposite ends of said shaft, a sprocket-chain connecting one of said sprocket-wheels with the sprocket-wheel on the ground-wheel, and a sprocket-chain connecting the other sprocket-wheel with the stirring and feeding devices, substantially as described.

9. The combination with a wheeled cultivator provided with a sprocket-wheel on one of the ground-wheels, of a seed-hopper provided with suitable stirring and feeding devices, a telescoping shaft journaled in bearings removably attached to the axle and comprising a solid rod having a flat side and a tubular shaft sleeved on said rod and slotted upon one side, a clip adjustably clamped about the slotted portion of the tubular shaft and engaging the flat side of the rod, sprocket-wheels fixed on the opposite ends of said shaft, and sprocket-chains connecting said sprocket-wheels respectively with the sprocket-wheel on the ground-wheel and the stirring and feeding devices, substantially as described.

In testimony whereof I have hereunto set my hand in presence of two subscribing witnesses.

JAMES MOSSES HOMESLEY.

Witnesses:
  W. K. MOSER,
  E. EUPSHAW.